(12) United States Patent  
Matsushima et al.

(10) Patent No.: US 8,405,388 B2
(45) Date of Patent: Mar. 26, 2013

(54) ROTATION ANGLE SENSOR HAVING A PERMANENT MAGNET DEVIATED FROM A CENTER OF A ROTATION SHAFT

(75) Inventors: Tomohiro Matsushima, Shimada (JP); Yasuhiro Sugimori, Shimada (JP)

(73) Assignee: Yazaki Corporation, Tokyo (JP)

( * ) Notice: Subject to any disclaimer, the term of this patent is extended or adjusted under 35 U.S.C. 154(b) by 225 days.

(21) Appl. No.: 12/760,177

(22) Filed: Apr. 14, 2010

(65) Prior Publication Data

US 2010/0265806 A1    Oct. 21, 2010

(30) Foreign Application Priority Data

Apr. 16, 2009    (JP) ................ P.2009-099648

(51) Int. Cl.
*G01B 7/30* (2006.01)
(52) U.S. Cl. .................. 324/207.25; 324/207.2
(58) Field of Classification Search ............ 324/207.25, 324/207.2, 207.21
See application file for complete search history.

(56) References Cited

U.S. PATENT DOCUMENTS

| | | | | |
|---|---|---|---|---|
| 5,712,561 A | * | 1/1998 | McCurley et al. | ......... 324/207.2 |
| 5,757,179 A | * | 5/1998 | McCurley et al. | ......... 324/207.2 |
| 5,982,170 A | * | 11/1999 | McCurley et al. | ......... 324/207.2 |
| 6,188,216 B1 | | 2/2001 | Fromer | |
| 2005/0007104 A1 | * | 1/2005 | Lequesne et al. | ........ 324/207.25 |
| 2005/0162157 A1 | * | 7/2005 | Kamizino et al. | ....... 324/207.25 |
| 2009/0151436 A1 | * | 6/2009 | Nagahori et al. | .......... 73/114.36 |

FOREIGN PATENT DOCUMENTS

| | | |
|---|---|---|
| JP | 2000-28312 | 1/2000 |
| JP | 2006125594 A | 5/2006 |

OTHER PUBLICATIONS

Japanese Office Action in corresponding Japanese Patent Application No. 2009-099648, dated Dec. 4, 2012.

* cited by examiner

*Primary Examiner* — Jay Patidar
*Assistant Examiner* — David M. Schindler
(74) *Attorney, Agent, or Firm* — Morgan, Lewis & Bockius LLP (57) ABSTRACT

A rotation angle sensor includes a rotation shaft, a yoke which is made from a magnetic permeable material and includes a first disk portion, a second disk portion and a connection portion magnetically connecting the first disk portion and the second disk portion, the first disk portion and the second disk portion being provided on the rotation shaft in an axial direction of the rotation shaft separately, a permanent magnet which is provided between the first disk portion and the second disk portion, and has an annular shape, and a magnetic field detection section which generates an output signal in response to an intensity of a magnetic field formed by the permanent magnet during a rotation of the rotation shaft. A center of the permanent magnet is deviated from a center of the rotation shaft so that a distance between the magnetic field detection section and an outer circumference of the permanent magnet in a direction perpendicular to the axis direction of the rotation shaft is gradually changed in accordance to the rotation of the shaft.

9 Claims, 11 Drawing Sheets

ROTATION ANGLE SENSOR HAVING A PERMANENT MAGNET DEVIATED FROM A CENTER OF A ROTATION SHAFT

BACKGROUND

The present invention relates to a rotation angle sensor which detects a rotation angle of a rotation shaft in such a manner that a hall element detects a magnetic field having intensity gradually changing in the circumferential direction of a disk of a yoke rotating together with the rotation shaft.

The following Patent Document 1 discloses a rotation angle sensor which detects a rotation angle of a rotation shaft in such a manner that a hall element detects a magnetic field having intensity gradually changing in the circumferential direction of a disk of a yoke rotating together with the rotation shaft.

Figure 7:
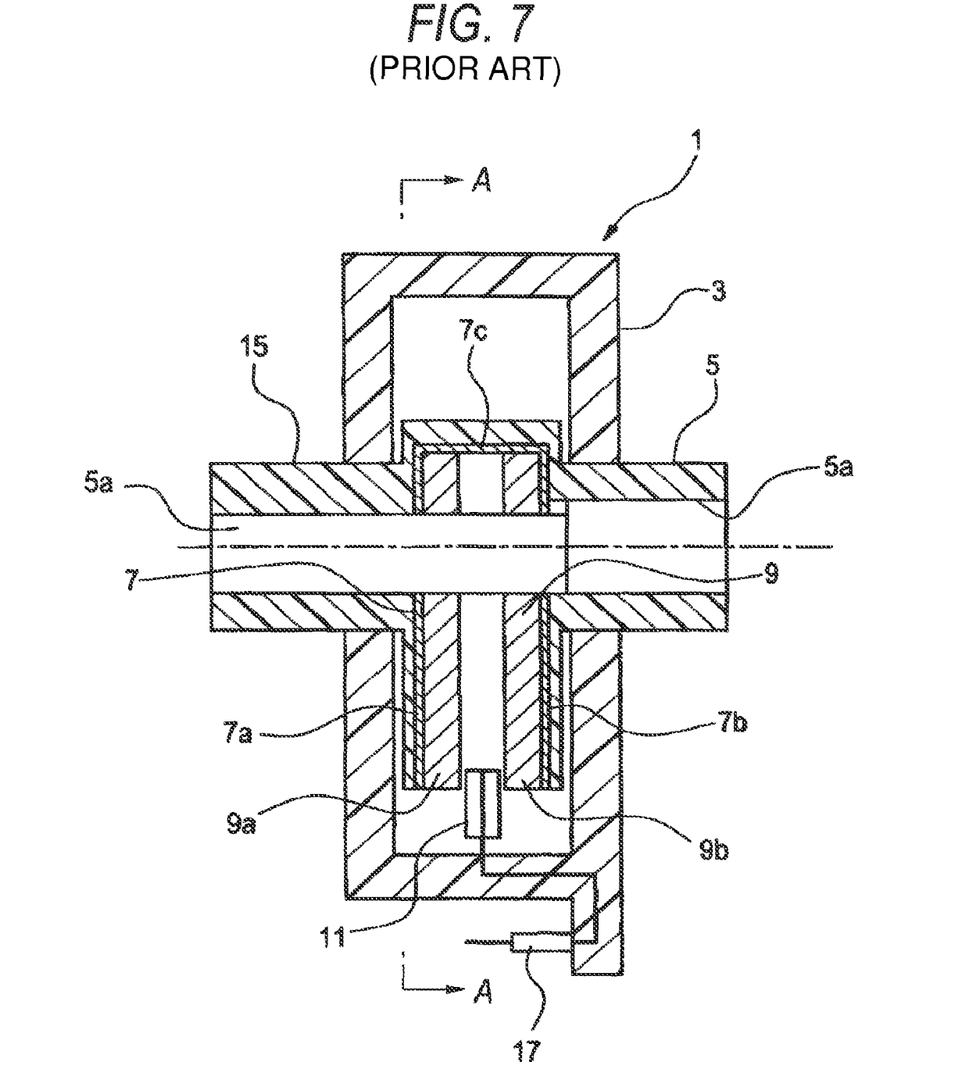
FIG. 7 is a longitudinal sectional view of an existing rotation angle sensor.
Figure 8:
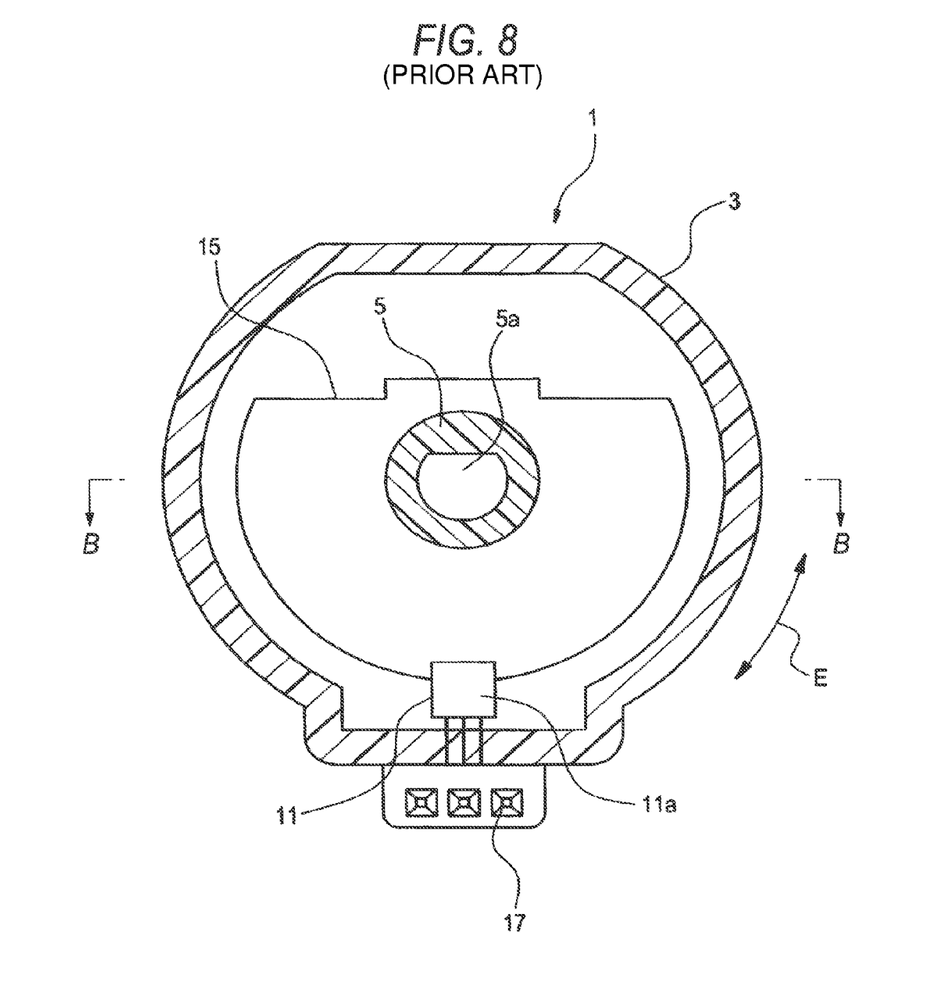
FIG. 8 is a sectional view taken along the line A-A of FIG. 7.

FIGS. 7 and 8 show a configuration of the rotation angle sensor having the same structure as that of the rotation angle sensor disclosed in the following Patent Document 1 and detecting the rotation of the rotation shaft.

A rotation angle sensor 1 shown in FIGS. 7 and 8 includes a yoke 7 which is made from a highly permeable material and is provided in a rotation shaft 5 rotatably supported to a sensor casing 3, a permanent magnet 9 which is fixed to the yoke 7, and a hall element (hall IC) 11 which generates an output signal in response to a force of an applied magnetic field.

Since the rotation shaft 5 has a shaft engagement hole 5a which is formed through the center of the rotation shaft and engages with a driving shaft (not shown), the rotation shaft 5 rotates together with the driving shaft engaging with the shaft engagement hole 5a.

Figure 10A:
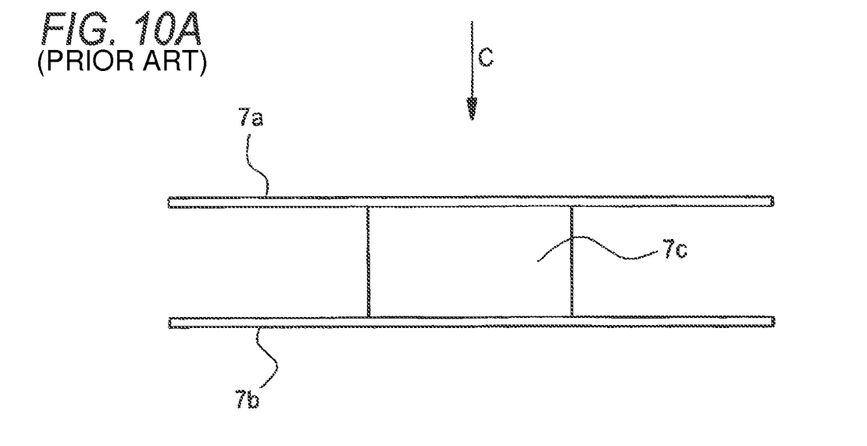
FIG. 10A is a side view of a yoke used in the rotation angle sensor shown in FIG. 7.
Figure 10B:
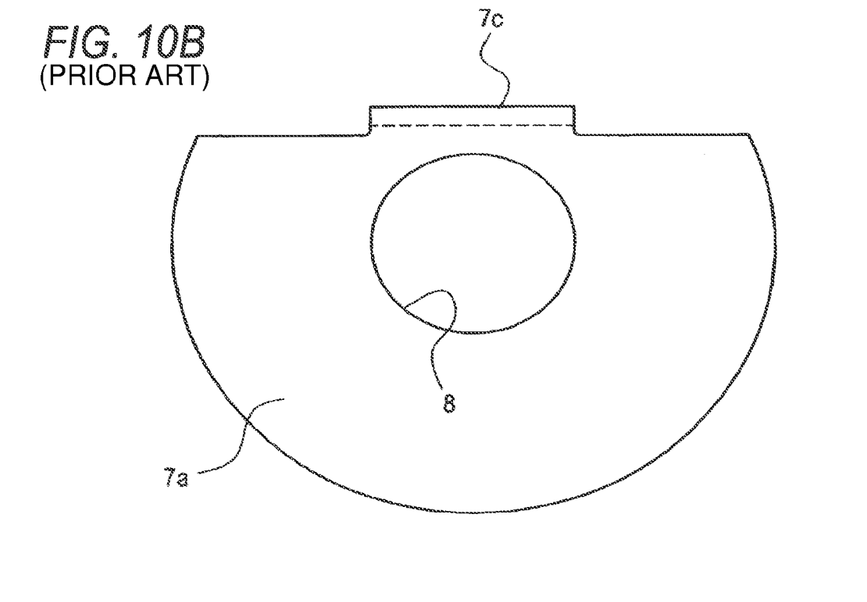
FIG. 10B is a diagram showing a shape when the yoke is seen in a direction depicted by the arrow C.

As shown in FIGS. 7, 10A and 10B, the yoke 7 has a configuration in which a pair of disks 7a and 7b fixed to two positions of the rotation shaft 5 in a flange shape and spaced from each other in the axial direction of the rotation shaft 5 is integrally formed with a connection portion 7c magnetically coupling the pair of disks 7a and 7b through press molding using a highly permeable metal plate.

The pair of disks 7a and 7b is attached to the rotation shaft 5 so as to be perpendicular to the axial direction of the rotation shaft 5. A shaft engagement hole 8 is formed through each of the disks 7a and 7b so as to be concentric with the shaft engagement hole 5a.

Figure 9:
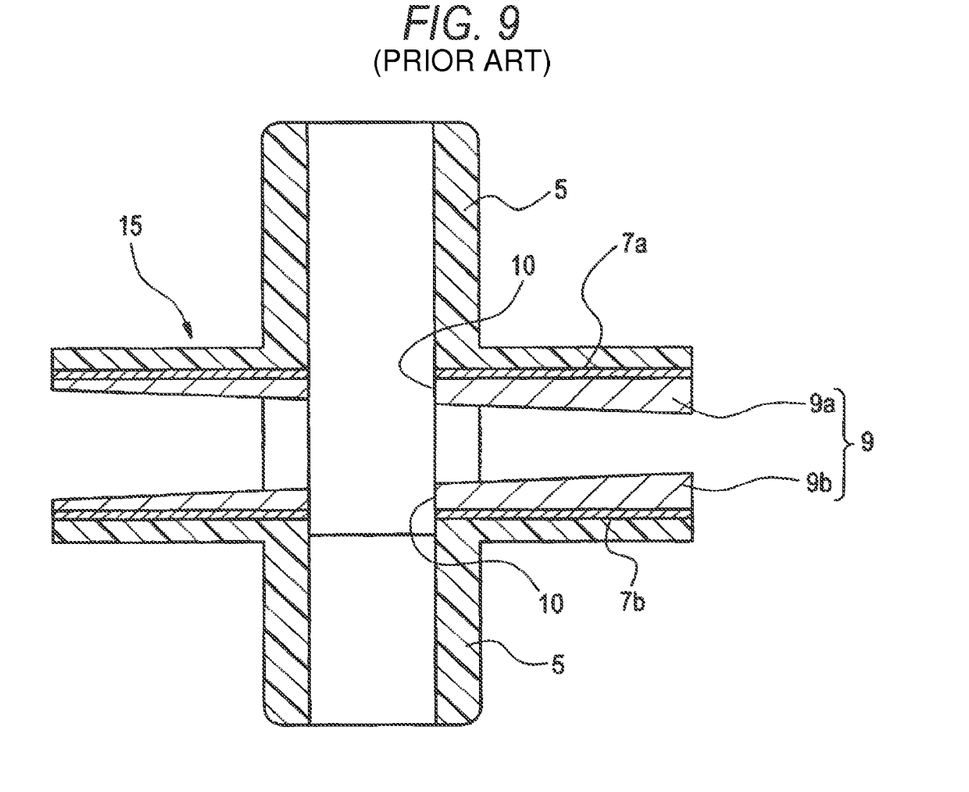
FIG. 9 is a sectional view taken along the line B-B of a shaft assembly of the rotation angle sensor shown in FIG. 8.

As shown in FIG. 9, the permanent magnet 9 includes a pair of magnet plates 9a and 9b respectively laminated on the facing surfaces of the pair of disks 7a and 7b.

Figure 11A:
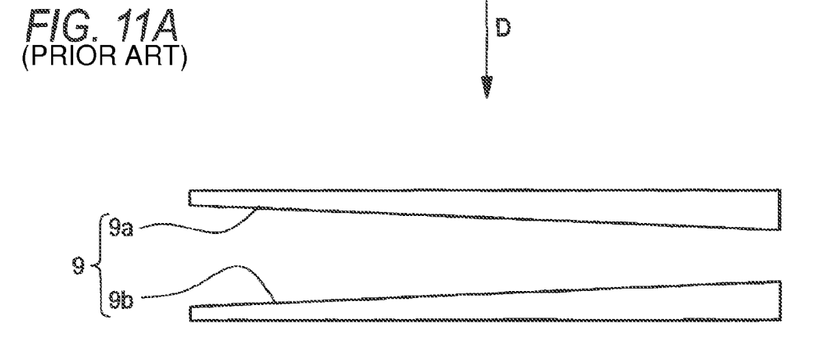
FIG. 11A is a side view of a pair of permanent magnets used in the rotation angle sensor shown in FIG. 7.
Figure 11B:
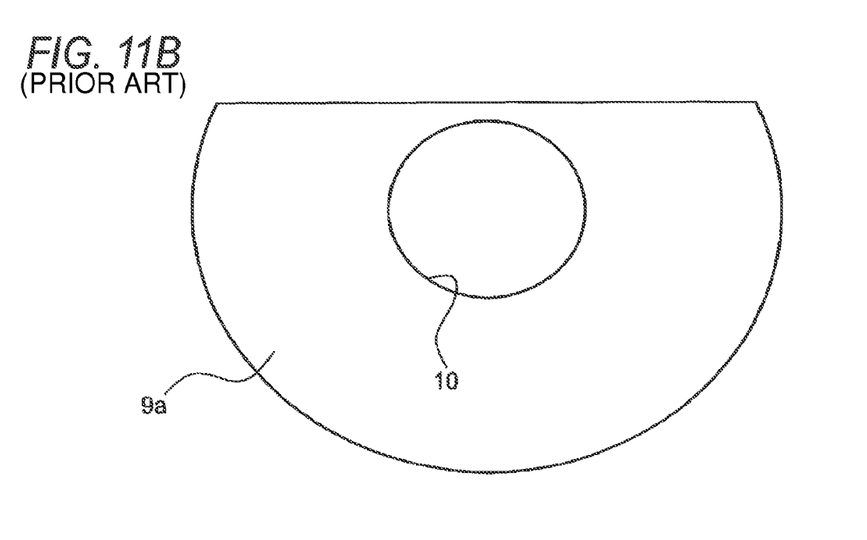
FIG. 11B is a diagram showing a shape when the pair of magnets is seen in a direction depicted by the arrow D.

The pair of magnet plates 9a and 9b has substantially the same shape as those of the pair of disks 7a and 7b in a plan view. As shown in FIGS. 9, 11A and 11B, a shaft engagement hole 10 is formed through the center of each of the magnet plates so as to be concentric with the shaft engagement hole 5a.

As for the shape in a side view, the pair of magnet plates 9a and 9b has a taper structure in which a plate thickness gradually changes in the circumferential direction as shown in FIG. 11A. This is because a magnetic field is formed so as to have a magnetic force gradually changing in the circumferential direction along the outer peripheries of the pair of disks 7a and 7b.

The rotation shaft 5 is made from a resin. The pair of disks 7a and 7b and the magnet plates 9a and 9b are integrally formed with the rotation shaft 5 through insert molding, and a shaft assembly 15 shown in FIG. 9 can be assembled to the sensor casing 3.

The hall element 11 is fixed to the sensor casing 3 so that a magnetic field detecting portion 11a is located in the middle of a gap between the pair of permanent magnets 9 and 9 facing each other in the outer peripheries of the pair of disks 7a and 7b. The output terminal of the hall element 11 is connected to an external connection terminal 17 installed in the sensor casing 3.

In the rotation angle sensor 1 shown in FIGS. 7 and 8, as described above, the magnet plates 9a and 9b have a structure in which the thickness of each of the magnet plates gradually changes in the circumferential direction of the pair of disks 7a and 7b. Accordingly, when the shaft assembly 15 is rotationally driven in a direction depicted by the arrow E of FIG. 8, a spaced distance (gap) between the magnetic field detecting portion 11a and each of the magnet plates 9a and 9b gradually changes in the circumferential direction of the disks 7a and 7b. Accordingly, since the magnetic flux density crossing the magnetic field detecting portion 11a changes, the output of the hall element 11 changes in response to the rotation angle of the shaft assembly 15, thereby detecting the rotation angle of the rotation shaft 5.

[Patent Document 1] JP-A-2000-028312

However, in the existing rotation angle sensor 1 having a structure in which a plate thickness of each of the magnet plates 9a and 9b fixed to the disks 7a and 7b gradually changes as shown in FIG. 11A in order to form a magnetic field having intensity gradually changing in the circumferential direction along the outer peripheries of the pair of disks 7a and 7b, there are problems in that the weight increases due to the increased plate thickness of each of the magnet plates 9a and 9b, and the cost increases due to trouble taken for the operation of processing the magnet plates 9a and 9b each having a tapered surface.

SUMMARY

The present invention is contrived to solve the above-described problem, and an object of the invention is to provide a rotation angle sensor capable of facilitating a process by simplifying a shape of a permanent magnet used to form a magnetic field, and realizing a decrease in cost and weight by decreasing the size thereof.

In order to achieve the above object, according to the present invention, there is provided a rotation angle sensor comprising:

a rotation shaft;

a yoke which is made from a magnetic permeable material and includes a first disk portion, a second disk portion and a connection portion magnetically connecting the first disk portion and the second disk portion, the first disk portion and the second disk portion being provided on the rotation shaft in an axial direction of the rotation shaft separately;

a permanent magnet which is provided between the first disk portion and the second disk portion, and has an annular shape; and a magnetic field detection section which generates an output signal in response to an intensity of a magnetic field formed by the permanent magnet during a rotation of the rotation shaft, wherein a center of the permanent magnet is deviated from a center of the rotation shaft so that a distance between the magnetic field detection section and an outer circumference of the permanent magnet in a direction perpendicular to the axis direction of the rotation shaft is gradually changed in accordance to the rotation of the shaft.

Preferably, a diameter of the permanent magnet is smaller than those of the first and second disk portions.

Preferably, the permanent magnet has a uniform plate thickness in a circumferential direction thereof.

Preferably, the magnetic field detection section is provided in a vicinity of outer circumferences of the first and second disk portions.

Preferably, the magnetic field detection section is spaced from the outer circumference of the permanent magnet in the direction perpendicular to the axis direction of the rotation shaft.

Preferably, the magnetic field detection section is a hall element.

Preferably, the rotation angle sensor is used as an AT shift position sensor of a vehicle.

Preferably, the rotation angle sensor is used as a throttle position sensor of a vehicle.

Preferably, the rotation angle sensor is used as a fuel remaining amount sensor of a vehicle.

According to the above configuration, a gap between the magnetic field detection section and the permanent magnet involved with the magnetic flux density crossing the magnetic field detection section is provided in the direction perpendicular to the axis direction of the rotation shaft. The permanent magnet is fixed onto the first and second disk portions while being deviated from the center of the rotation shaft, thereby obtaining a structure in which a distance between the magnetic field detection section and the permanent magnet gradually changes in the direction perpendicular to the axis direction of the rotation shaft during the rotation of the rotation shaft.

Accordingly, when the first and second disk portions are rotationally driven together with the rotation shaft, since the magnetic flux density crossing the magnetic field detection section changes in accordance with the rotation of the rotation shaft, the output of the magnetic field detection section changes in accordance with a rotation angle of the rotation shaft, thereby detecting the rotation angle of the rotation shaft.

In addition, since the permanent magnet is formed as an annular shape having a uniform plate thickness and a diameter of the permanent magnet is smaller than those of the first and second disk portions, it is possible to simplify the structure and to decrease the size compared with the existing magnet plate which has substantially the same shape as that of the disk and of which the plate thickness gradually changes. Accordingly, it is possible to decrease the cost and the weight.

According to the above configurations, since the rotation angle sensor is used as the AT shift position sensor, the throttle position sensor, the fuel remaining amount sensor, and the like of a vehicle, it is possible to contribute to a decrease in the size, weight, and cost of the vehicle.

In the rotation angle sensor according to the invention, it is possible to form the permanent magnet fixed to the first and second disk portions of the yoke so as to have an annular shape having a uniform plate thickness and a diameter of the permanent magnet is smaller than those of the first and second disk portions, and to decrease the size by simplifying the structure of the permanent magnet or decreasing the thickness thereof. Accordingly, it is possible to realize a decrease in cost and weight.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, a rotation angle sensor acceding to a preferred embodiment of the invention will be described in detail with reference to the drawings.

Figure 1:
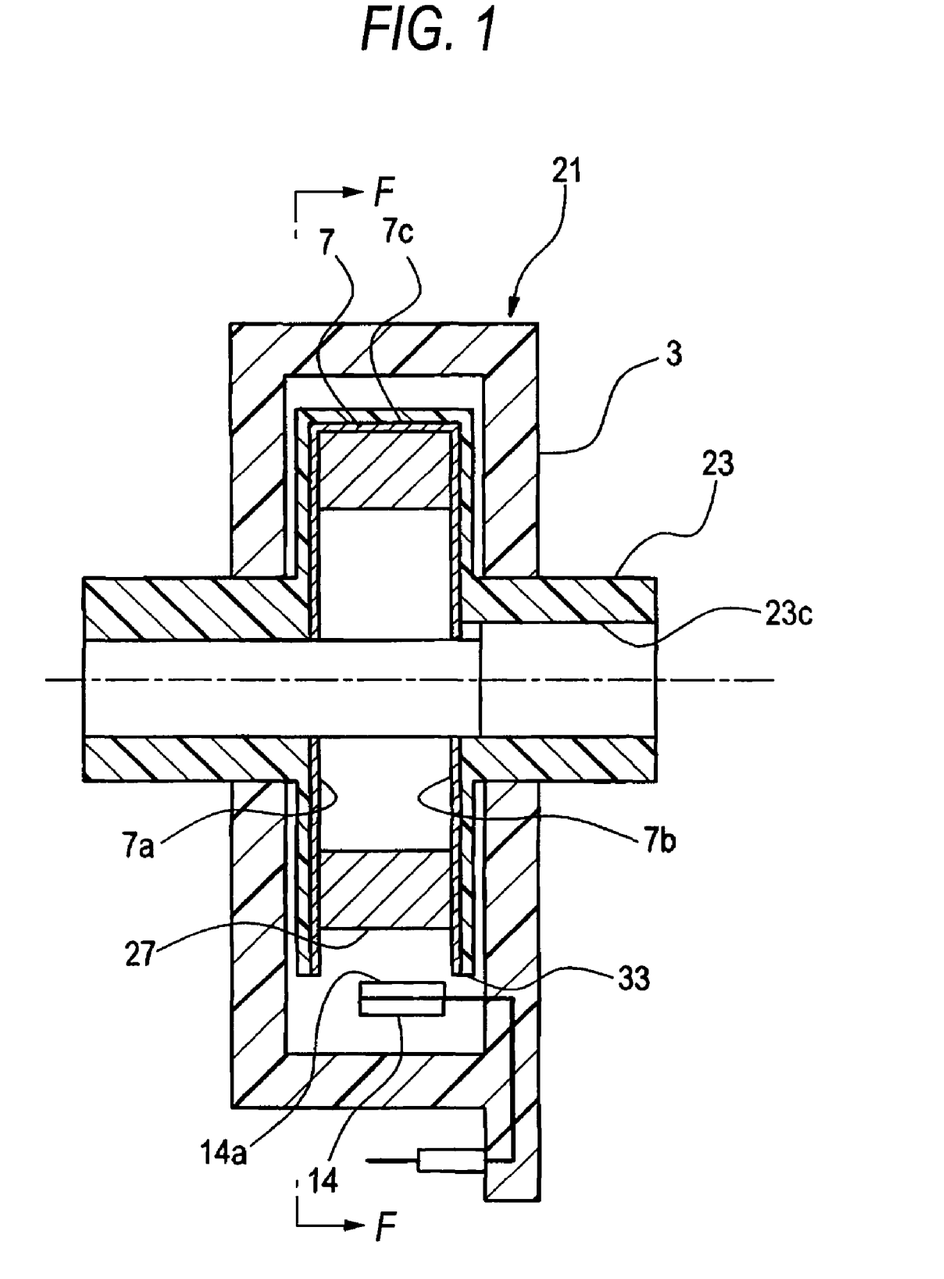
FIG. 1 is a longitudinal sectional view of a rotation angle sensor according to an embodiment of the invention.
Figure 2:
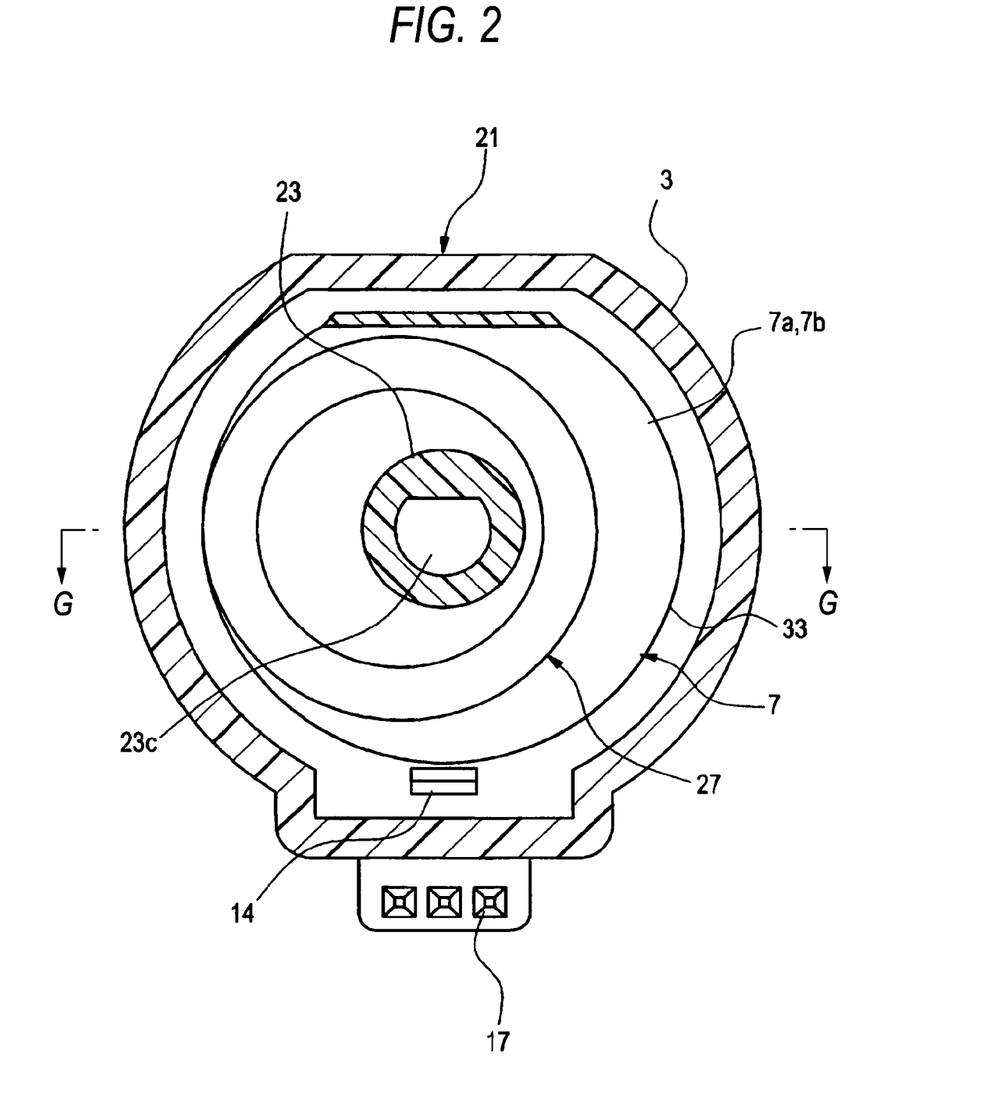
FIG. 2 is a sectional view taken along the line F-F of FIG. 1.

As shown in FIGS. 1 and 2, a rotation angle sensor 21 according to the embodiment of the invention includes a yoke 7 which is made from a highly permeable material and is provided in a rotation shaft 23 rotatably supported to a sensor casing 3, a permanent magnet 27 which is fixed to the yoke 7, and a hall element (hall IC) 14 which generates an output signal in response to intensity of an applied magnetic field.

Since the rotation shaft 23 has a shaft engagement hole 23c which is formed through the center of the rotation shaft and engages with a driving shaft (not shown), the rotation shaft rotates together with the driving shaft engaging with the shaft engagement hole 23c.

As shown in the configuration shown in FIGS. 10A and 10B, the yoke 7 has a configuration in which a pair of disks 7a and 7b fixed to two positions on the rotation shaft 23 in a flange shape and spaced from each other in the axial direction of the rotation shaft 23 is integrally formed with a connection portion 7c magnetically coupling the pair of disks 7a and 7b through press molding using a highly permeable metal plate.

The pair of disks 7a and 7b is attached to the rotation shaft 23 so as to be perpendicular to the axial direction of the rotation shaft 23. A shaft engagement hole 8 is formed through each of the disks 7a and 7b so as to be concentric with the shaft engagement hole 23c.

The hall element 14 is fixed to the sensor casing 3 so as to be located at the sensor installation position (the position of the hall element 14 shown in FIGS. 1 and 2) provided in the outer peripheries of the pair of disks 7a and 7b fixed to the rotation shaft 23. An output terminal of the hall element 14 is connected to an external connection terminal 17 provided in the sensor casing 3.

The sensor installation position is a position which is appropriately spaced from the outer peripheries of the pair of disks 7a and 7b in the radial direction of the disks 7a and 7b, and the hall element 14 is disposed so that a surface 14a for receiving a magnetic line faces the rotation center of the disks 7a and 7b.

Figure 4:
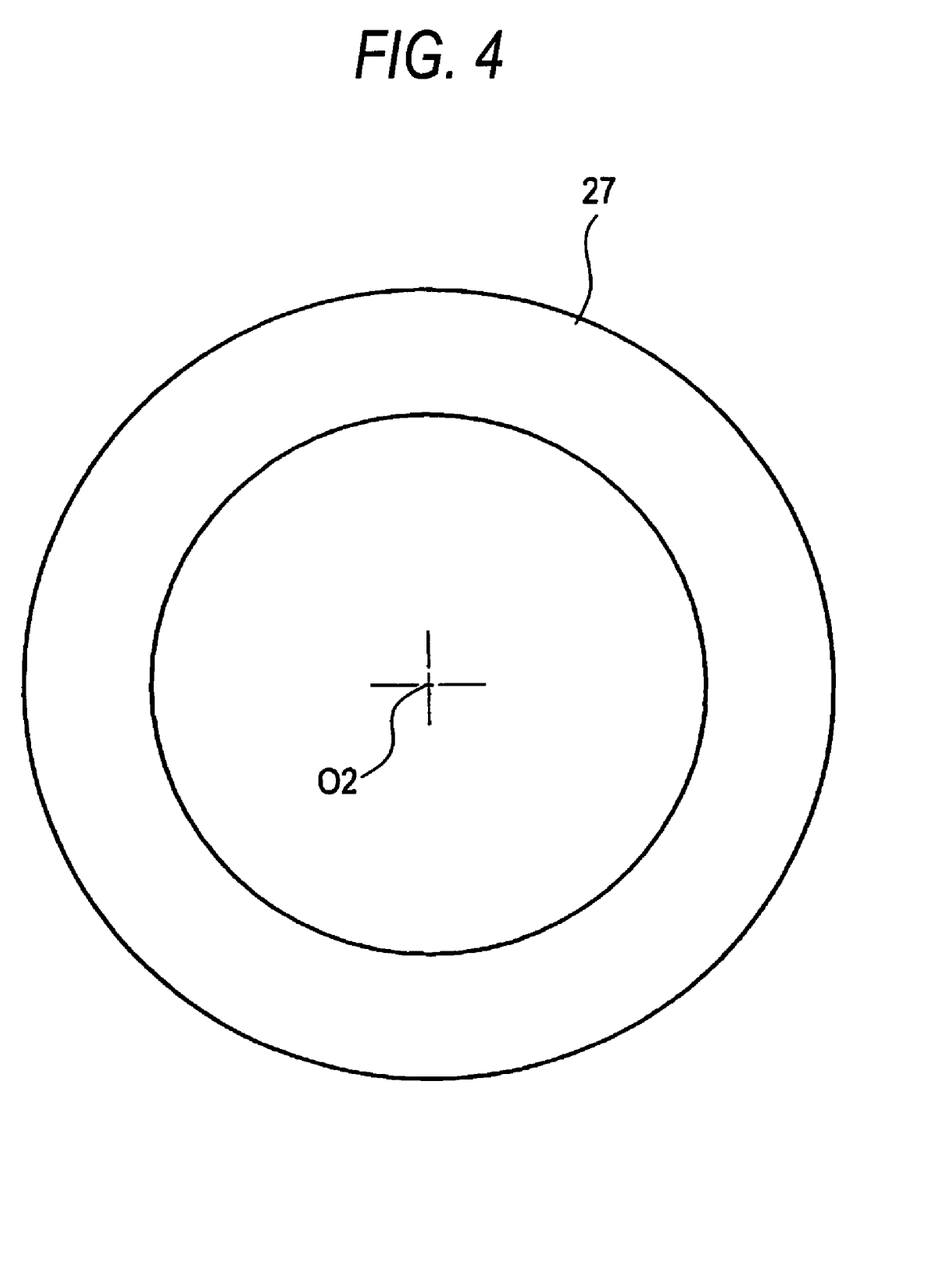
FIG. 4 is a plan view of the permanent magnet shown in FIG. 1.
Figure 5:
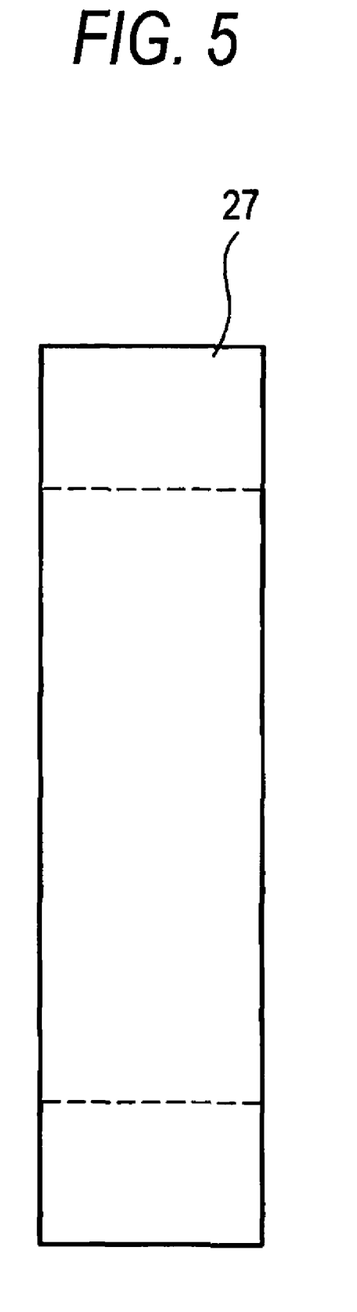
FIG. 5 is a side view of the permanent magnet shown in FIG. 2.
Figure 6:
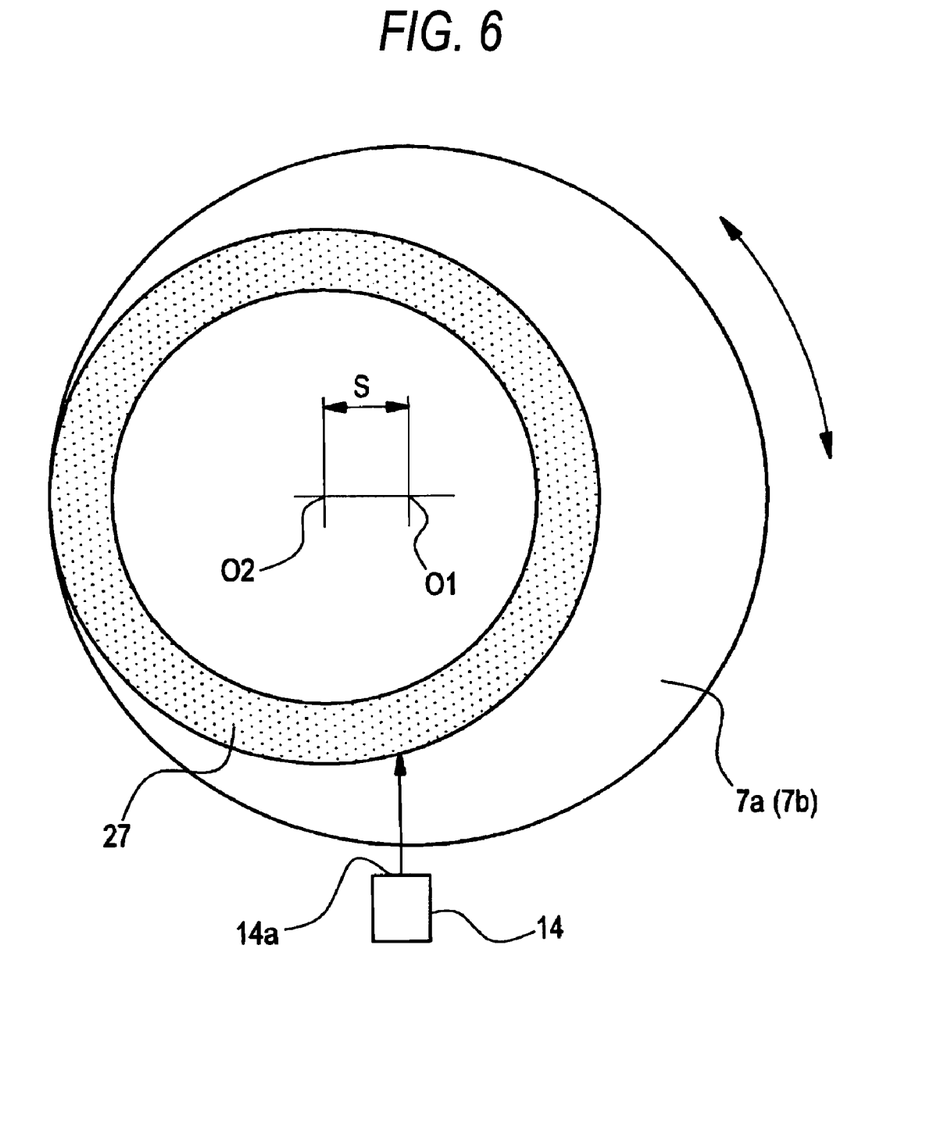
FIG. 6 is an explanatory diagram of a gap between a hall element and a permanent magnet according to the embodiment of the invention.

In the case of the embodiment, as shown in FIGS. 4 and 5, the permanent magnet 27 is formed as an annular shape having a uniform plate thickness thereof. Also, a diameter of the permanent magnet 27 is smaller than that of each of the disks 7a and 7b. In addition, as shown in FIG. 6, the permanent magnet 27 is fixed between the pair of disks 7a and 7b by deviating the annular center O2 from the rotation shaft 23 or the center O1 of each of the disks 7a and 7b by a distance s.

The rotation shaft 23 is made from a resin. The yoke 7 and the yoke 25 are integrally formed with the rotation shaft 23 through insert molding, and a shaft assembly 33 shown in FIG. 3 is attached to the sensor casing 3.

Figure 3:
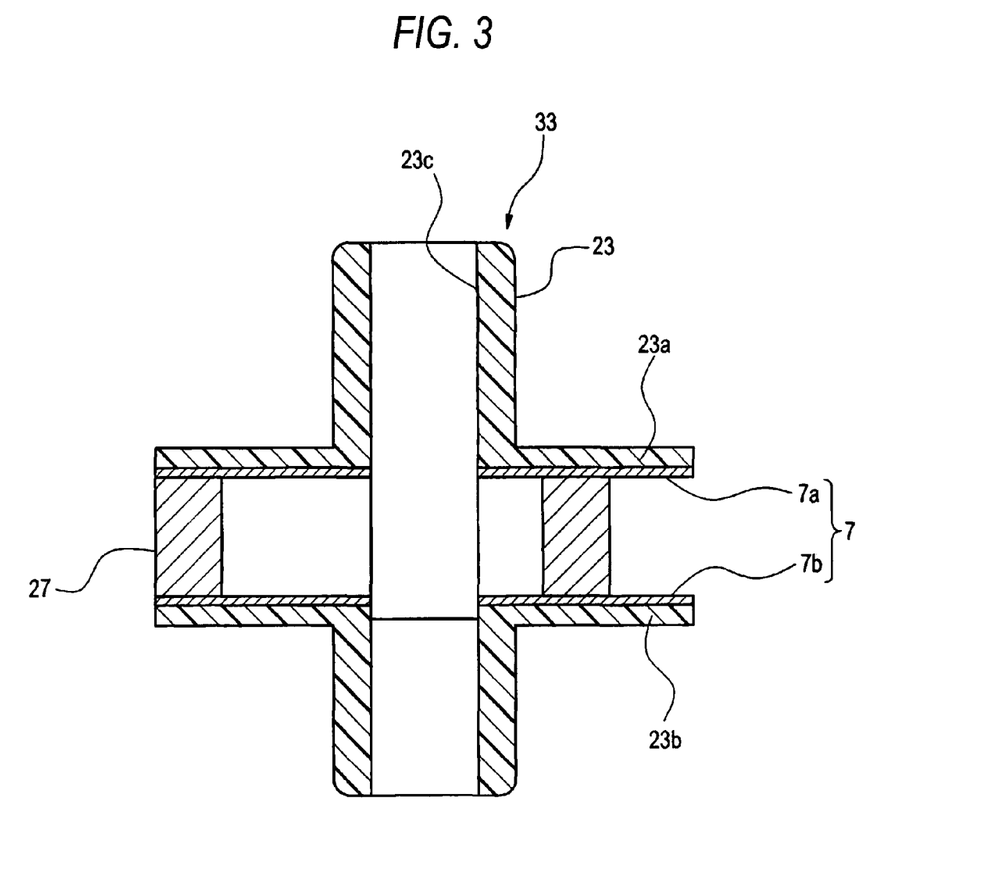
FIG. 3 is a sectional view taken along the line G-G of a shaft assembly of the rotation angle sensor shown in FIG. 1.

In addition, as shown in FIG. 3, during insert molding, a part of a resin forming the rotation shaft 23 is laminated on the outer surface of each of the pair of disks 7a and 7b to thereby form protection walls 23a and 23b for protecting the disks 7a and 7b.

In the rotation angle sensor 21 according to the above-described embodiment, a gap between the hall element 14 and the permanent magnet 27 involved with the magnetic flux density crossing the hall element 14 is a gap of the rotation shaft 23 in the radial direction. As shown in FIGS. 2 and 6, the permanent magnet 27 is fixed onto the disks 7a and 7b while being deviated from the center O1 of the rotation shaft 23, thereby obtaining a structure in which a gap between the outer peripheral surface of the permanent magnet 27 and the hall element 14 gradually changes in the circumferential direction of the disks 7a and 7b during the rotation of the disks 7a and 7b.

Accordingly, when the disks 7a and 7b are rotationally driven together with the rotation shaft 23, since the magnetic flux density crossing the hall element 14 changes in accordance with the rotation, the output of the hall element 14 changes in accordance with the rotation angle of the rotation shaft 23, thereby detecting the rotation angle of the rotation shaft 23.

In addition, since the permanent magnet 27 is formed as an annular shape having a uniform plate thickness and a diameter smaller than that of each of the disks 7a and 7b, it is possible to simplify the structure and to decrease the size compared with the existing magnet plate which has substantially the same shape as that of the disk and of which the plate thickness gradually changes. Accordingly, it is possible to decrease the cost and the weight.

Furthermore, since the rotation angle sensor is used as an AT shift position sensor, a throttle position sensor, a fuel remaining amount sensor, and the like of a vehicle, it is possible to contribute to a decrease in the size, weight, and cost of the vehicle.

The invention is not limited to the above-described embodiment, but may be appropriately modified and improved. In addition, the material, the shape, the dimension, the number, the arrangement position, and the like of the constituents of the above-described embodiment may be arbitrarily set, and are not particularly limited as long as the invention is embodied.

The present application is based on Japanese Patent Application No. 2009-099648 filed on Apr. 16, 2009, the contents of which are incorporated herein for reference.

What is claimed is:

1. A rotation angle sensor, comprising:
a rotation shaft;
a yoke which is made from a magnetic permeable material and includes a first disk portion, a second disk portion, and a connection portion magnetically connecting the first disk portion and the second disk portion, the first disk portion and the second disk portion being provided on the rotation shaft and separated from each other in an axial direction of the rotation shaft except where they are connected by the connection portion;
a permanent magnet which is provided between the first disk portion and the second disk portion, and has an annular shape; and
a magnetic field detection section which generates an output signal in response to an intensity of a magnetic field formed by the permanent magnet during a rotation of the rotation shaft,
wherein a center of the permanent magnet is deviated from a center of the rotation shaft so that a distance between the magnetic field detection section and an outer circumference of the permanent magnet in a direction perpendicular to the axial direction of the rotation shaft is gradually changed in accordance with the rotation of the shaft.

2. The rotation angle sensor according to claim 1, wherein a diameter of the permanent magnet is smaller than those of the first and second disk portions.

3. The rotation angle sensor according to claim 1, wherein the permanent magnet has a uniform thickness.

4. The rotation angle sensor according to claim 1, wherein the magnetic field detection section is provided in a vicinity of outer circumferences of the first and second disk portions.

5. The rotation angle sensor according to claim 1, wherein the magnetic field detection section is spaced from the outer circumference of the permanent magnet in the direction perpendicular to the axial direction of the rotation shaft.

6. The rotation angle sensor according to claim 1, wherein the magnetic field detection section is a hall element.

7. An automatic transmission (AT) shift position sensor of a vehicle comprising the rotation angle sensor of claim 1.

8. A throttle position sensor of a vehicle comprising the rotation angle sensor of claim 1.

9. A fuel remaining amount sensor of a vehicle comprising the rotation angle sensor of claim 1.

* * * * *